Patented Dec. 1, 1931

1,834,880

UNITED STATES PATENT OFFICE

ROBERT TWELLS, OF DETROIT, MICHIGAN, ASSIGNOR TO GENERAL ELECTRIC COMPANY, A CORPORATION OF NEW YORK

PORCELAIN

No Drawing. Application filed April 28, 1928. Serial No. 273,713.

The present invention comprises an improved ceramic material which is particularly useful as a high tension electrical insulator.

Porcelain commonly consists of a mixture of clay, silica, and feldspar. I have discovered that some of the physical properties of porcelain, which are of particular importance in an electrical insulator may be markedly improved by introducing the mica known as lepidolite into the porcelain mixture. Lepidolite is a mica which chemically consists of a silicate of potassium, lithium and aluminum. It also contains an appreciable amount of fluorine and also in addition small quantities of water, iron, manganese, calcium, magnesium, sodium, rubidium and cæsium.

In accordance with my invention lepidolite may be substituted for part of the usual feldspar content of the porcelain or may be used as the sole flux in producing vitrification. In either case a porcelain may be produced having an unusually low maturing temperature, and having other advantageous properties as herein described.

The following specific examples of the unfired or green mixture illustrate my invention as applied to the manufacture of a porcelain suitable for high tension electrical line insulators, for low tension insulators, and for refractory articles requiring a body resistant to thermal shocks.

|  | Example 1 | Example 2 | Example 3 |
| --- | --- | --- | --- |
|  | [Parts being given by weight] | | |
| Feldspar | 14.3 | | |
| Lepidolite | 7.2 | 14.5 | 32 |
| Silica | 27.0 | 31.4 | 19.5 |
| Ball clay | 20.6 | 21.6 | 19.4 |
| China clay | 30.9 | 32.5 | 29.1 |

The desired mixture of porcelain-forming ingredients containing the lepidolite is subjected to the usual blunging or grinding of ingredients, followed by pressing, forming and drying. The dried porcelain articles finally are fired in the usual way.

The mixture given in Example 1, which contains feldspar preferably is fired to a temperature of 1300° C. but when the feldspar is entirely replaced by lepidolite the porcelain matures at a firing temperature depending upon its lepidolite content. This would be as low as 1150° C. in case of a high lepidolite content.

Porcelain having the above composition is superior to ordinary porcelain in appearance, whiteness and resistance to violent temperature changes or thermal shocks. Its mechanical strength and electrical insulation value are also good, being about the same as those of a regular high tension electrical insulator porcelain. Bodies containing lepidolite would also be particularly suitable for use in heating devices or wherever insulators are desired which are subjected to wide temperature variations.

What I claim as new and desire to secure by Letters Patent of the United States is:—

1. A green porcelain body containing lepidolite mica as a constitutent.
2. A green porcelain body comprising silica, clay and lepidolite mica.
3. A green porcelain body comprising silica, clay, feldspar and lepidolite mica.
4. A porcelain comprising a fired mixture of silica, clay, feldspar and lepidolite mica.
5. A porcelain comprising a fired mixture of silica, clay and lepidolite mica.
6. A green unfired porcelain body comprising by weight about 14 to 32 parts lepidolite mica, about 3 to 19 parts silica, about 21 to 19 parts ball clay, and about 32 to 29 parts china clay.

In witness whereof, I have hereunto set my hand this 25th day of April, 1928.

ROBERT TWELLS.